(12) United States Patent
Yoshida

(10) Patent No.: US 9,612,513 B2
(45) Date of Patent: Apr. 4, 2017

(54) PROJECTOR HAVING ILLUMINANCE SENSOR AND OBSTACLE SENSOR WITH LIGHT EMITTING SECTION

(71) Applicant: Seiko Epson Corporation, Tokyo (JP)

(72) Inventor: Shingo Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 54 days.

(21) Appl. No.: 14/629,236

(22) Filed: Feb. 23, 2015

(65) Prior Publication Data

US 2015/0244996 A1 Aug. 27, 2015

(30) Foreign Application Priority Data

Feb. 27, 2014 (JP) ................. 2014-036420

(51) Int. Cl.
G03B 21/20 (2006.01)
H04N 9/31 (2006.01)
G03B 21/28 (2006.01)
G03B 21/00 (2006.01)

(52) U.S. Cl.
CPC ......... *G03B 21/2053* (2013.01); *G03B 21/00* (2013.01); *G03B 21/28* (2013.01); *H04N 9/3155* (2013.01); *H04N 9/3194* (2013.01)

(58) Field of Classification Search
CPC .. G03B 21/2053; G03B 21/28; H04N 9/3155; H04N 9/3194
See application file for complete search history.

(56) References Cited

U.S. PATENT DOCUMENTS

| 6,929,370 | B2 | 8/2005 | Kobayashi et al. |
| 7,093,943 | B2 | 8/2006 | Kobayashi et al. |
| 7,201,484 | B2 | 4/2007 | Kobayashi et al. |
| 2004/0179172 | A1 | 9/2004 | Kobayashi et al. |
| 2005/0264769 | A1 | 12/2005 | Kobayashi et al. |
| 2006/0232751 | A1 | 10/2006 | Kobayashi et al. |
| 2010/0321644 | A1 | 12/2010 | Otsuki et al. |
| 2013/0128240 | A1* | 5/2013 | Yoshida .............. H04N 9/3155 353/85 |
| 2013/0194554 | A1* | 8/2013 | Aruga ................. G03B 21/147 353/69 |

FOREIGN PATENT DOCUMENTS

| JP | 2006-119676 A | 5/2006 |
| JP | 3886521 B | 2/2007 |
| JP | 2011-2614 A | 1/2011 |
| JP | 2012-134601 A | 7/2012 |

* cited by examiner

*Primary Examiner* — Sultan Chowdhury
*Assistant Examiner* — Magda Cruz
(74) *Attorney, Agent, or Firm* — ALG Intellectual Property, LLC

(57) ABSTRACT

Illuminance in a space where a projector projects an image is accurately detected with failure of the projector due to heat accumulation prevented. The projector includes a window that allows light to pass therethrough, a projection section that projects light through the window to project an image, an illuminance sensor that detects illuminance in a space where the image is projected, an obstacle sensor that has a light emitting section and a light receiving section, the light emitting section emitting second light, the light receiving section receiving the second light, the obstacle sensor detecting an obstacle based on an output from the light receiving section, and a control section that disables the detection of the illuminance during a period for which the light emitting section emits the light.

10 Claims, 6 Drawing Sheets

PROJECTOR HAVING ILLUMINANCE SENSOR AND OBSTACLE SENSOR WITH LIGHT EMITTING SECTION

The entire disclosure of Japanese Patent Application No. 2014-036420, filed Feb. 27, 2014 is expressly incorporated by reference herein.

BACKGROUND

1. Technical Field

The present invention relates to a projector.

2. Related Art

As disclosed in Japanese Patent No. 3,886,521, there is a known technology for preventing failure of a projector due to heat accumulation by providing an obstacle sensor in a position close to a window of the projector through which light is projected. Further, as disclosed in JP-A-2012-134601, there is a known technology for detecting illuminance in a space where a projector projects an image and adjusting the image quality in accordance with the detected illuminance.

When a projector is provided with both the obstacle sensor and the illuminance sensor, light emitted from the obstacle sensor prevents the detection of illuminance, undesirably resulting in improper image quality adjustment.

SUMMARY

An advantage of some aspects of the invention is to accurately detect illuminance in a space where a projector projects an image while preventing failure of the projector due to heat accumulation.

(1) A projector according to an aspect of the invention includes a window that allows light to pass therethrough, a projection section that projects first light through the window to project an image, an illuminance sensor that detects illuminance in a space where the image is projected, an illuminance sensor that detects illuminance in a space where the image is projected, an obstacle sensor that has a light emitting section and a light receiving section, the light emitting section emitting second light, the light receiving section receiving the second light, the obstacle sensor detecting an obstacle based on an output from the light receiving section, and a control section that disables the detection of the illuminance during a period for which the light emitting section emits the second light.

According to the aspect of the invention, since an obstacle that causes heat accumulation can be detected and the output from the illuminance sensor is not affected by the light used to detect an obstacle, the illuminance in the space where an image is projected can be accurately detected.

(2) In the projector according to the aspect of the invention, when the obstacle is detected, the control section may disable the detection of the illuminance until the obstacle is not detected.

When the configuration described above is employed, and when an obstacle blocks the light radiated through the window and therefore lowers the illuminance in the space where an image is projected, the detection of the illuminance is terminated, whereby detection of incorrect illuminance in the space where an image is projected will not occur.

(3) In the projector according to the aspect of the invention, the control section may disable the detection of the illuminance in accordance with a change index representing the illuminance and control the light emitting section to emit the second light to detect the obstacle.

When the configuration described above is employed, and when an obstacle blocks the light radiated through the window, the obstacle sensor is allowed to detect the obstacle even during a preset period for which the obstacle sensor is not activated to detect an obstacle. The change index representing the illuminance only needs to be a value representing the degree of a change in the illuminance and can, for example, be a difference in the illuminance between different points of time or the rate of a change in the illuminance. For example, when a measured value of the illuminance has changed from a value measured last time by at least a predetermined value, the control section may disable the detection of the illuminance and control the light emitting section to emit the light to detect the obstacle.

(5) In the projector according to the aspect of the invention, the control section may change the proportion of the lengths of operation periods of the illuminance sensor and the obstacle sensor in accordance with the attitude of the projector.

When the configuration described above is employed, the proportion of the period for which the obstacle sensor detects an obstacle is increased in a state in which an obstacle that blocks the projected light tends to cause heat accumulation, whereas the proportion of the period for which the obstacle sensor detects an obstacle is decreased in a state in which an obstacle that blocks the projected light does not tend to cause heat accumulation, whereby the obstacle sensor and the illuminance sensor can be efficiently used. For example, when the light emitting section is so provided that it emits light that passes through the window, the control section may set the length of the operation period of the obstacle sensor to be longer than the length of the operation period of the illuminance sensor when the attitude of the projector tends to cause part or the entire of the window to be blocked with an obstacle, whereas the control section sets the length of the operation period of the illuminance sensor to be longer than the length of the operation period of the obstacle sensor when the attitude of the projector does not tend to cause part or the entire of the window to be blocked with an obstacle.

The function of each section described in the appended claims is achieved by a hardware resource the configuration of which identifies the function by themselves, or a hardware resource a program for which identifies the function, or the combination thereof. Further, the functions of the sections are not limited to those achieved by the hardware resources physically independent of each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
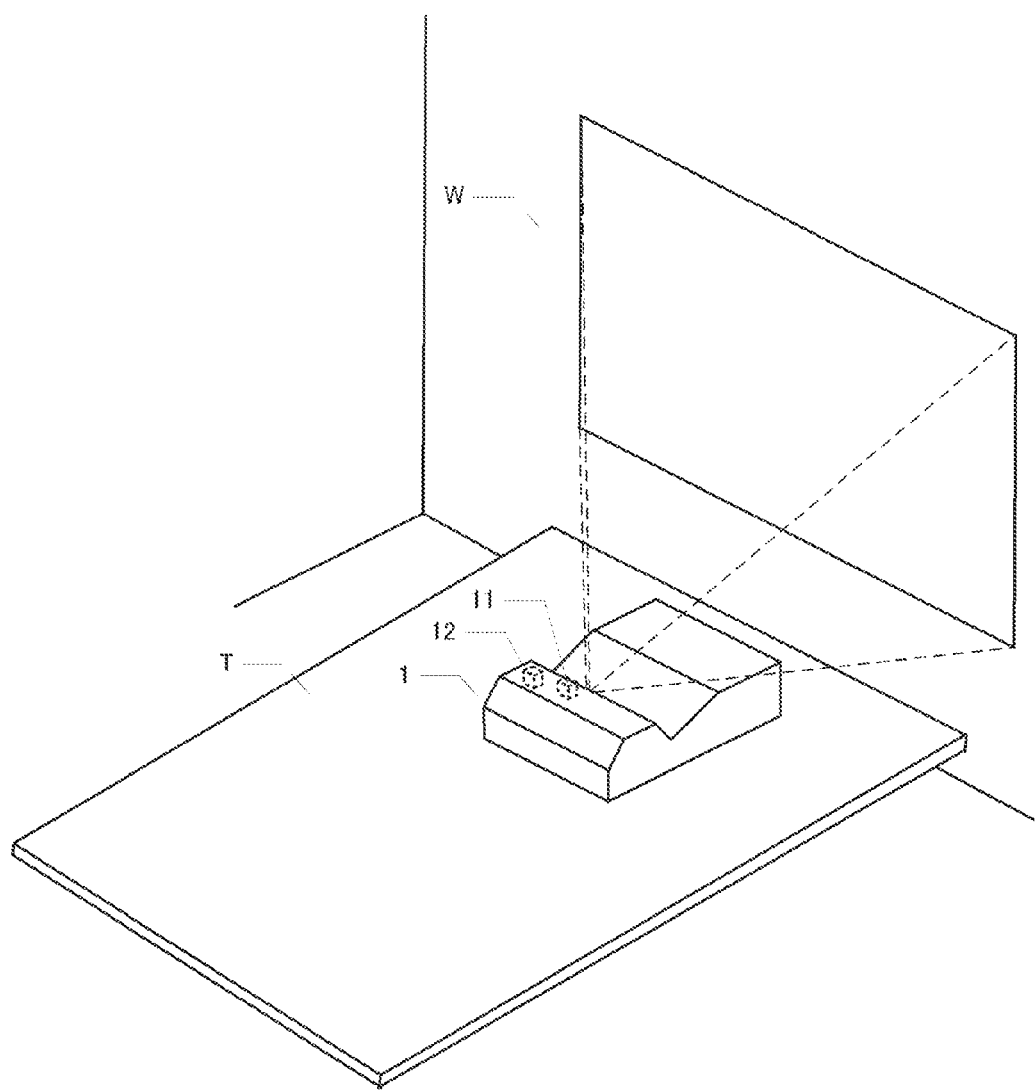
FIG. 1 is a perspective view according to an embodiment of the invention.

Embodiments of the invention will be described below with reference to the accompanying drawings. Components corresponding to each other in the drawings have the same reference characters, and no duplicated description will be made.

1. Outline

Figure 2:
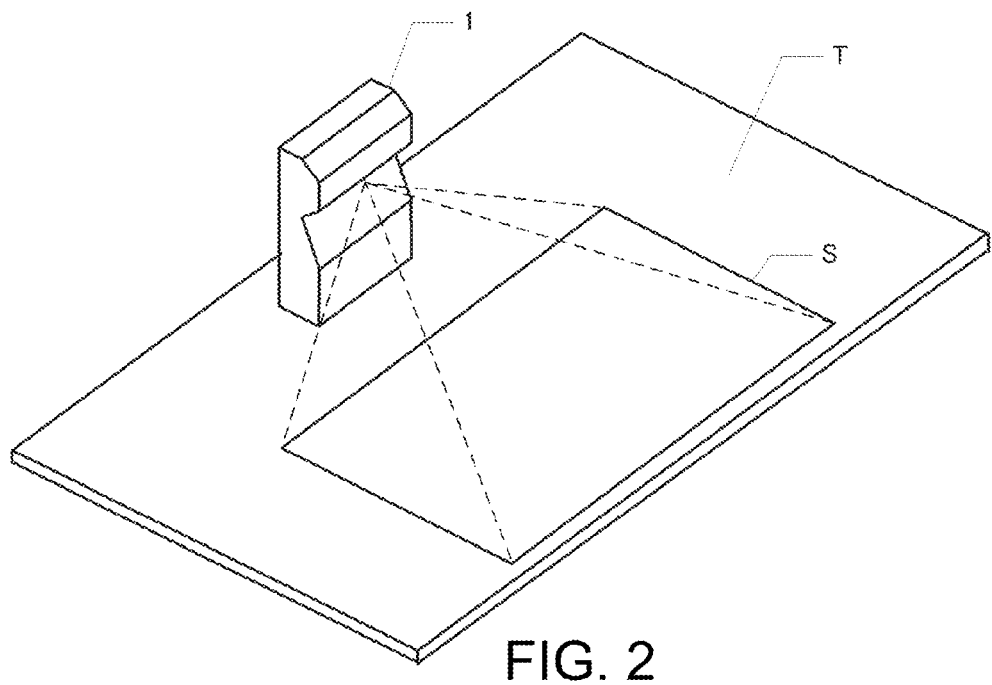
FIG. 2 is a perspective view according to the embodiment of the invention.
Figure 3:
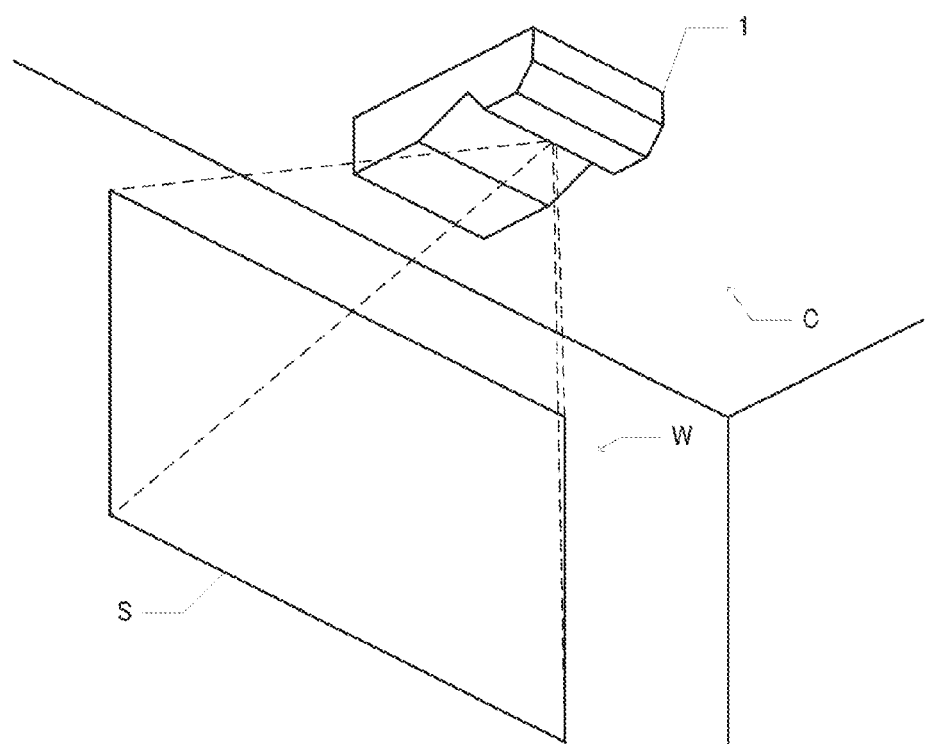
FIG. 3 is a perspective view according to the embodiment of the invention.
Figure 4:
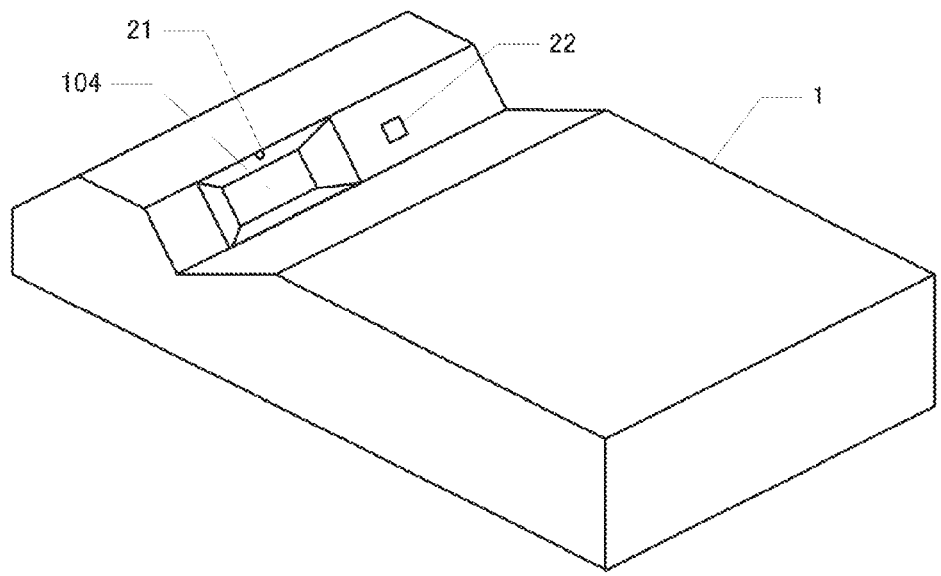
FIG. 4 is a perspective view according to the embodiment of the invention.

A projector 1 according to an embodiment of the invention is installed on a ceiling C, a wall W, a table T, or any other surface and projects an image on the wall W, the table T, a dedicated screen, or any other surface, as shown in FIGS. 1 to 3. A window through which the projector 1 projects light is provided on the side that forms the upper surface of the projector 1 when it is installed on a horizontal surface, such as the table T, as shown in FIG. 1. Therefore, when the projector 1 is installed on a horizontal surface, such as the table T, the window may be accidentally blocked with an obstacle. If the window through which light is projected is blocked, for example, with a sheet of paper that tends to absorb light, the optical energy is converted into thermal energy, resulting in failure of the projector 1 due to heat accumulation. To prevent the problem, in the present embodiment, an obstacle sensor 21 is provided in a position close to a window 104, through which the projector 1 projects light, as shown in FIG. 4. On the other hand, a person who looks at an image projected by the projector 1 perceives the image differently depending on the illuminance in a room where the projector 1 is installed and the color of illumination light in the room. To address the problem, the projector 1 is provided with an illuminance sensor 22, and brightness information contained in image data and the luminance of a projection light source are adjusted in accordance with the illuminance detected with the illuminance sensor 22. The illuminance sensor 22 is controlled to stop operating during a period for which the obstacle sensor 21 operates so that the light emitted from the obstacle sensor 21 does not change the illuminance detected with the illuminance sensor 22.

2. Configuration of Projector

Figure 5:
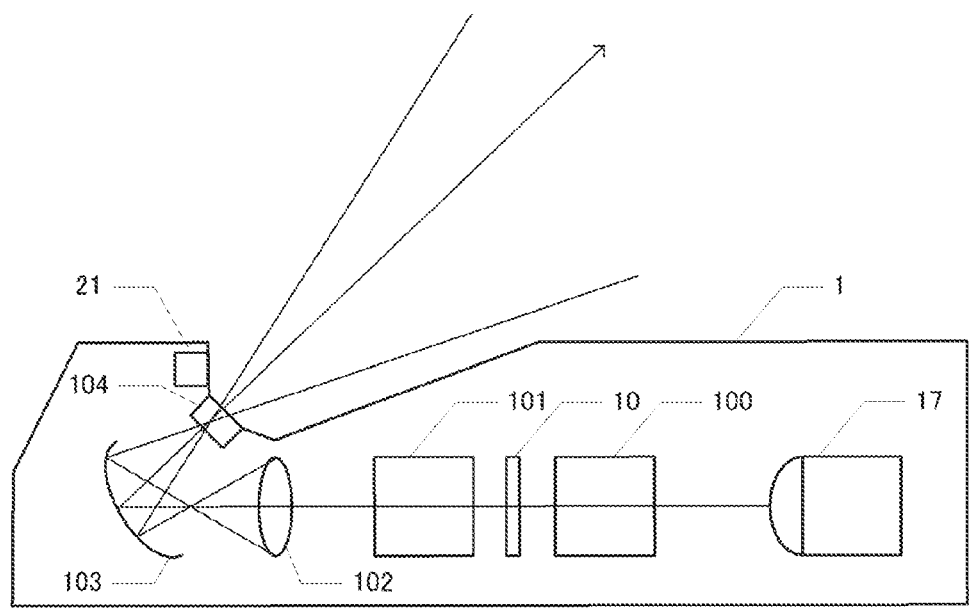
FIG. 5 is a diagrammatic cross-sectional view according to the embodiment of the invention.
Figure 6:
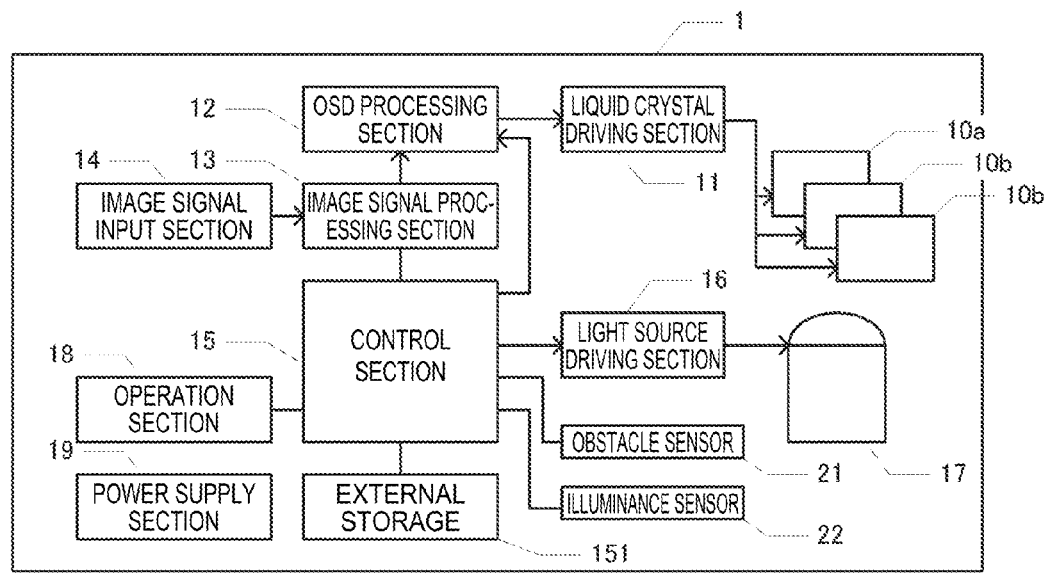
FIG. 6 is a block diagram according to the embodiment of the invention.

The projector 1 includes a projection light source 17, a liquid crystal light valve 10, a dichroic mirror 100, a dichroic prism 101, a lens 102, a concave mirror 103, a projection window 104, each of which is shown in FIG. 5, a liquid crystal driving section 11, an OSD processing section 12, an image signal processing section 13, an image signal input section 14, a control section 15, an external storage 151, a light source driving section 16, an operation section 18, a power supply section 19, the obstacle sensor 21, the illuminance sensor 22, and other components, as shown in FIG. 6. The projection light source 17 is formed, for example, of a high-pressure mercury lamp, an LED, or a laser and driven by the light source driving section 16. The image signal input section 14 receives a variety of image signals as an input from an external apparatus. The image signal processing section 13 generates image data based on the image signal inputted from the external apparatus and in accordance with the state of projection. The OSD processing section 12 combines the image data based on the image signal inputted from the external apparatus with image data generated by the control section 15 and representing characters and other types of information and outputs the combined image data. The liquid crystal driving section 11 converts the image data outputted from the OSD processing section 12 into an analog signal for driving each pixel in the liquid crystal light valve 10. The liquid crystal light valve 10 includes three liquid crystal panels 10a, 10b, and 10c, which control how much each pixel thereof transmits light fluxes of red, green, and blue wavelengths emitted from the projection light source 17 and separated by the dichroic mirror 100. The control section 15 executes a control program stored in the external storage 151 to adjust a parameter according to which the image signal processing section 13 to convert the image signal into the image data based on an output from the illuminance sensor 22, adjust the luminance of the projection light source 17, and control the components of the projector 1. The operation section 18 issues a variety of instructions to the control section 15.

Figure 7:
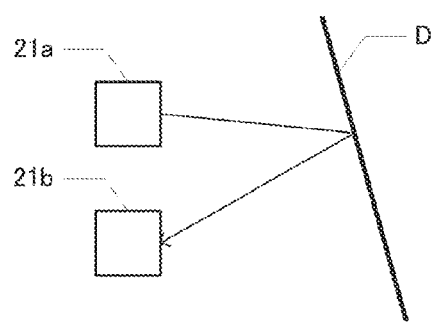
FIG. 7 is a diagrammatic view according to the embodiment of the invention.

The light fluxes having been emitted from the projection light source 17 and having passed through the liquid crystal light valve 10 are combined with each other by the dichroic prism 101, are projected by the lens 102 and the concave mirror 103 through the projection window 104, and form an image on a projection surface, such as the wall W or the table T, as shown in FIG. 5. The light reflected off the concave mirror 103 converges to a point in the vicinity of the projection window 104, and heat therefore tends to be accumulated in a portion close to the projection window 104. To detect an obstacle that may block the projection window 104, the obstacle sensor 21 is disposed in a position close to the outer edge of the projection window 104, as shown in FIGS. 4 and 5. The obstacle sensor 21 includes a light emitting section 21a, which emits light containing infrared light wavelengths and visible light wavelengths, and a light receiving section 21b, which receives light emitted from the light emitting section 21a and reflected off an obstacle D, as shown in FIG. 7. The light receiving section 21b outputs a signal according to the intensity of the light of the infrared light wavelengths.

The illuminance sensor 22, which is configured to detect the illuminance in a space where an image is projected, is disposed on the side where the projection window 104 is provided so that the illumination sensor 22 receives light that travels in the direction opposite to the direction in which the light projected through the projection window 104 travels. The illumination sensor 22 outputs a signal according to the intensity of light of visible light wavelengths. The light of the visible light wavelengths is emitted from the obstacle sensor 21 as well as through the projection window 104. Therefore, when the illuminance sensor 22 detects illuminance during a period for which the obstacle sensor 21 operates, the illuminance detected with the illuminance sensor 22 increases due to the light emitted from the obstacle sensor 21.

3. Operation of Projector

Figure 8:
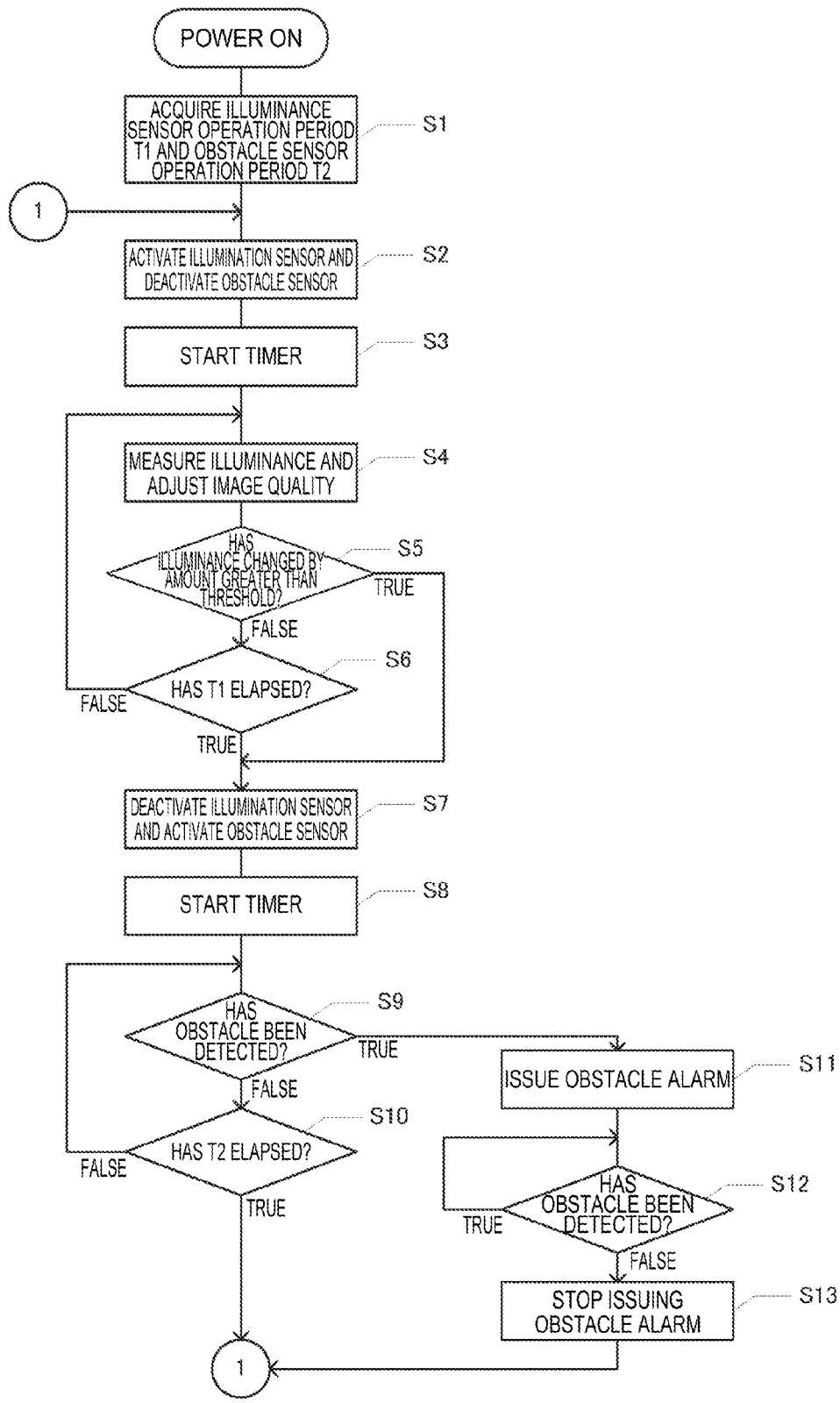
FIG. 8 is a flowchart according to the embodiment of the invention.
Figure 9A:
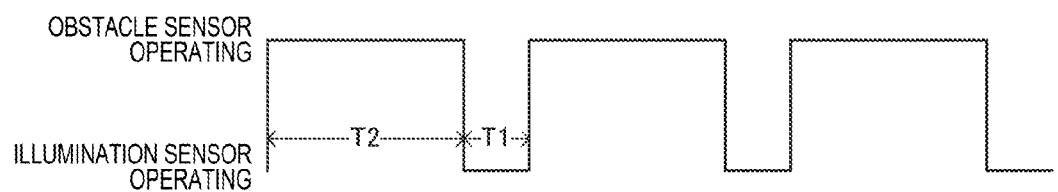
FIGS. 9A and 9B are timing charts according to the embodiment of the invention.
Figure 9B:
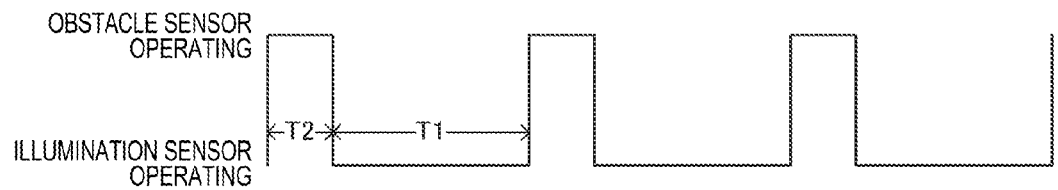

The operation of the projector 1 will next be described with reference to FIG. 8 and FIGS. 9A and 9B.

When the projector 1 is activated, the control section 15 first acquires an operation period T1 of the illumination sensor 22 and an operation period T2 of the obstacle sensor 21 (S1). The operation periods T1 and T2, which are determined in accordance with the attitude of the projector 1, are set in advance by the control section 15 and stored in the external storage 151. The attitude of the projector 1 may be set by a user who is prompted to operate the operation section 18 or may be determined based on an output from an attitude sensor provided to detect gravity. When the projector 1 is so installed that the projection window 104 is likely to be blocked with an obstacle, the control section 15 sets the operation period T2 of the obstacle sensor 21 at a large value and the operation period T1 of the illumination sensor 22 at a small value, as shown in FIG. 9A. On the other hand, when the projector 1 is so installed that the projection window 104 is unlikely to be blocked with an obstacle, the control section 15 sets the operation period T2 of the obstacle sensor 21 at a small value and the operation period T1 of the illumination sensor 22 at a large value, as shown in FIG. 9B. Specifically, for example, when the projector 1 is installed on a horizontal surface, such as the table T, in an attitude in which the projection window 104 faces upward as shown in FIG. 1, the control section 15 sets the operation period T2 of the obstacle sensor 21 at a large value and the operation period T1 of the illumination sensor 22 at a small value. On the other hand, for example, when the projector 1 is installed on the ceiling C as shown in FIG. 3 or on the wall W, the control section 15 sets the operation period T2 of the obstacle sensor 21 at a small value and the operation period T1 of the illumination sensor 22 at a large value. When the projector 1 is installed on the table T in an attitude in which the projection window 104 faces sideways as shown in FIG. 2 or when the projector 1 is installed on the wall W, the operation period T2 of the obstacle sensor 21 may be set at a large value, a small value, or an intermediate value.

The control section 15 then activates the illumination sensor 22 and deactivates the obstacle sensor 21 (S2). For example, the control section 15 controls the power supply section 19 in such a way that it starts supplying the illuminance sensor 22 with electric power and stops supplying the obstacle sensor 21 with electric power so that the light emitting section 21a of the obstacle sensor 21 emits no light.

The control section 15 then sets the operation period T1 of the illumination sensor 22 and starts a timer (S3). An illuminance measurement period is controlled by the thus set operation period T1.

The control section 15 then controls the illuminance sensor 22 to measure the illuminance and adjusts the image quality of an image projected by the projector 1 (S4). Specifically, the control section 15 acquires an output from the illuminance sensor 22, sets an image quality adjustment parameter according to which the image signal processing section 13 operates, and adjusts the output level of the light source drive section 16 to adjust the luminance of the projection light source 17. Therefore, during the illuminance measurement period, the image signal processing section 13 performs image processing according to the illuminance in the space where the projector 1 projects an image and adjustment of the luminance of the projection light source 17. The image processing performed by the image signal processing section 13 includes contrast adjustment, chroma adjustment, and a variety of other types of color conversion.

The control section 15 then evaluates whether or not the illuminance has changed by an amount greater than a predetermined threshold (S5). Specifically, the control section 15 evaluates whether or not the difference between the illuminance measured this time in step S4 and the illuminance measured last time in step S4 is greater than the predetermined threshold. The threshold is set based on the range over which the illuminance changes when an obstacle blocks part or the entire of the projection window 104. The difference to be compared in this process between the illuminance measured this time and the illuminance measured last time corresponds to a change index.

When the illuminance has not changed by an amount greater than the predetermined threshold, the control section 15 evaluates whether or not the period T1 has elapsed since the start of the timer that is measuring the illuminance measurement period (S6). When the period T1 has not yet elapsed, the control section 15 repeats the processes in step S4 to S6.

When the illuminance has changed by an amount greater than the predetermined threshold or when the period T1 has elapsed since the start of the timer that is measuring the illuminance measurement period, the control section 15 deactivates the illuminance sensor 22 and activates the obstacle sensor 21 (S7). For example, the control section 15 controls the power supply section 19 in such a way that it stops supplying the illuminance sensor 22 with electric power and starts supplying the obstacle sensor 21 with electric power so that the light emitting section 21a of the obstacle sensor 21 emits light.

As described above, the projector 1 deactivates the illuminance sensor 22 and activates the obstacle sensor 21 when the illuminance detected with the illuminance sensor 22 has changed by an amount greater than the predetermined threshold corresponding to a change that occurs when an obstacle blocks part or the entire of the projection window 104 irrespective of elapsed time shorter than the predetermined illuminance measurement period T1. As a result, when an obstacle blocks part or the entire of the projection window 104, no improper image quality adjustment based on the illuminance detected with the illuminance sensor 224 will be performed.

Further, since the projector 1 drives the obstacle sensor 21 and the illuminance sensor 22 in a time division manner, the illuminance sensor 22 will not sense the light emitted from the light emitting section 21a of the obstacle sensor 21. The illuminance sensor 22 will therefore not measure illuminance higher than illuminance measured in accordance with the light emitted from the projection light source 17 as well as light from a room light source and natural light, that is, illuminance that is intended to be measured. As a result, image quality adjustment based on an illuminance measurement result can be performed with increased accuracy.

The control section 15 then sets the operation period T2 of the obstacle sensor 21 and starts the timer (S8). The period for which the obstacle sensor 21 performs measurement is controlled by the thus set operation period T2.

The control section 15 then evaluates whether or not the obstacle sensor 21 has detected an obstacle in a position close to the projection window 104 (S9). Specifically, the control section 15 evaluates whether or not the output from the light receiving section 21b of the obstacle sensor 21 has become greater than a predetermined threshold. When the light receiving section 21b receives the light of the infrared light wavelengths emitted from the light emitting section 21a and reflected off an obstacle in the vicinity of the light receiving section 21b, the output from the light receiving section 21b increases. On the other hand, when the light of the infrared light wavelengths emitted from the light emitting section 21a is not reflected off an obstacle in the vicinity of the light receiving section 21b, the output from the light receiving section 21b decreases. Therefore, when there is an obstacle that blocks part or the entire of the projection window 104 is present in a position close to the obstacle sensor 21, the output from the light receiving section 21b of the obstacle sensor 21 increases.

When the obstacle sensor 21 has detected no obstacle in a position close to the projection window 104, the control section 15 evaluates whether or not the period T2 has elapsed since the start of the timer that is measuring the obstacle detection period (S10). When the period T2 has not yet elapsed, the control section 15 repeats the processes in steps S9 and S10. When the period T2 has elapsed since the start of the timer, the control section 15 repeats the processes described above in step S2 and the following steps.

When the obstacle sensor 21 has detected an obstacle in a position close to the projection window 104, the control section 15 issues an obstacle alarm (S11). For example, a message that prompts the user to remove the obstacle may be projected. To this end, the control section 15 outputs image data representing the message to the OSD processing section 12. The control section 15 may instead, for example, cause an indicator provided in the projector 1 to blink, cause a display provided in the operation section 18 to display the message, or cause a buzzer provided in the projector 1 to emit a sound to issue the obstacle alarm.

The control section 15 subsequently evaluates whether or not the obstacle sensor 21 has detected again the obstacle in a position close to the projection window 104 (S12). When the obstacle has been removed, the control section 15 determines that no obstacle has been detected because the output from the light receiving section 21b of the obstacle sensor 21 decreases.

When no obstacle is detected in step S12, the control section 15 stops issuing the obstacle alarm (S13) and repeats the processes described above in step S2 and the following steps. Therefore, when an obstacle has been detected once, the obstacle sensor 21 keeps operating and the illuminance sensor 22 is not activated until no obstacle is detected irrespective of elapsed time shorter than the predetermined operation period T2 of the obstacle sensor 21. As a result, the illuminance sensor 22 is not activated in a state in which it measures illuminance lower than the illuminance that is intended to be measured due to the presence of the obstacle, whereby improper image quality adjustment will not be performed.

According to the embodiment described above, since an obstacle that causes heat accumulation can be detected without fail and the output from the illuminance sensor 22 is not affected by the light used to detect an obstacle, the illuminance in the space where an image is projected can be accurately detected, whereby stable, high-precision image quality adjustment can be performed before image projection. Further, depending on the attitude of the projector 1, the proportion of the period for which the obstacle sensor 21 detects an obstacle is increased in a state in which an obstacle that blocks the projected light tends to cause heat accumulation, whereas the proportion of the period for which the obstacle sensor 21 detects an obstacle is decreased in a state in which an obstacle that blocks the projected light does not tend to cause heat accumulation, whereby the obstacle sensor 21 and the illuminance sensor 22 can be efficiently used.

4. Other Embodiments

The technical range of the invention is not limited to the embodiment described above, and a variety of changes can, of course, be made thereto to the extent that the changes do not depart from the substance of the invention.

For example, as the illuminance change index, a difference between the averages of illuminance measured every predetermined numbers may be compared with the threshold, or the illuminance itself may be compared as the change index with the threshold. To compare the change index in the form of the illuminance itself with the threshold, the threshold may be set at illuminance which cannot be measured unless the projection window 104 is almost completely blocked with, for example, a sheet of paper and which corresponds to brightness information contained in image data to be projected (instead of brightness of image to be formed on projection surface but brightness information contained in image data itself). That is, in this case, the threshold to be directly compared with the illuminance is a function of the image data.

Further, for example, to project an image, a single liquid crystal panel may be used to modulate light, a reflective liquid crystal panel may be used to modulate light, or a DMD (digital mirror device) may be used to modulate light. Moreover, for example, to enlarge and project a projection image, a convex mirror may be used or no mirror may be used.

Further, the projection window 104 may be a lens that refracts light or a flat transparent plate made, for example, of glass. The projection window 104 is not necessarily formed on the side that forms the upper surface of the projector 1 when it is installed on a horizontal surface and may be formed on the side that forms aside surface of the projector 1 (surface substantially parallel to vertical direction) installed on a horizontal surface.

The obstacle sensor 21 may instead be so configured that the light emitted from the light emitting section 21a and traveling straight through a portion in the vicinity of the projection window 104 is incident on the light receiving section 21b. In this case, when an obstacle is present in a position close to the projection window 104, the light incident on the light receiving section 21b is blocked with the obstacle, and the output from the light receiving section 21b therefore decreases. Further, the obstacle sensor 21 may be disposed in any position where it can detect an obstacle present in a position close to a window that allows the light emitted from the projection light source 17 to pass out of an enclosure of the projector 1. For example, the light emitting section 21a and the light receiving section 21b of the obstacle sensor 21 may be separately positioned on opposite sides of the projection window 104.

The illuminance sensor 22 only needs to be capable of detecting the illuminance in the space where the projector 1 projects an image and may be a sensor capable of detecting the color temperature and other parameters as well as the illuminance. The illuminance sensor 22 may be disposed in any position where it can detect the illuminance in the space where the projector 1 projects an image. As long as the illuminance sensor 22 is disposed in a position where it does not receive the light emitted from the obstacle sensor 21, the illuminance sensor 22 is not affected by the light emitted from the light emitting section 21a.

The light emitting section 21a does not necessarily emit light of a specific wavelength. When the light emitted from the light emitting section 21a does not contain light of visible light wavelengths at all and the light detected with the illuminance sensor 22 is limited to visible light, the illuminance sensor 22 is not affected by the light emitted from the light emitting section 21a.

The period for which the illuminance is measured and the period for which the obstacle sensor emits light may be controlled in any manner in which the periods do not overlap with each other. For example, the timing at which the illuminance is measured and the timing at which the obstacle sensor emits light and detects an obstacle may be simply so set that they occur alternately. Instead, the period for which the illuminance is measured per measurement operation and the period for which the obstacle sensor emits light per light emission operation may be set to be equal to each other, and the period for which the illuminance is measured and the period for which the obstacle sensor emits light may be controlled based on the frequency of the illuminance measurement and the frequency of light emission from the obstacle sensor.

Further, the image quality adjustment according to the illuminance may be performed only when image data to be projected is specific image data. For example, the image quality adjustment according to the illuminance may be performed only when the projector 1 projects an image based on image data containing predetermined brightness information.

What is claimed is:

1. A projector comprising:
   a window that allows light to pass therethrough;
   a projection section that projects first light through the window to project an image;
   an illuminance sensor that detects illuminance in a space where the image is projected;
   an obstacle sensor that has a light emitting section and a light receiving section, the light emitting section emitting second light, the light receiving section receiving the second light, the obstacle sensor detecting an obstacle based on an output from the light receiving section; and
   a control section that disables the detection of the illuminance by the illuminance sensor during a period for which the light emitting section emits the second light.

2. The projector according to claim 1,
   wherein when the obstacle is detected, the control section disables the detection of the illuminance by the illuminance sensor until the obstacle is not detected.

3. The projector according to claim 1,
   wherein the control section disables the detection of the illuminance by the illuminance sensor in accordance with a change index representing the illuminance and controls the light emitting section to emit the second light to detect the obstacle.

4. The projector according to claim 1,
   wherein when a measured value of the illuminance has changed from a value measured last time by at least a predetermined value, the control section disables the detection of the illuminance by the illuminance sensor and controls the light emitting section to emit the second light to detect the obstacle.

5. The projector according to claim 1,
   wherein the control section changes the proportion of the lengths of operation periods of the illuminance sensor and the obstacle sensor in accordance with the attitude of the projector.

6. The projector according to claim 1,
   wherein the light emitting section emits the second light that passes through the window, and
   the control section sets the length of an operation period of the obstacle sensor to be longer than the length of an operation period of the illuminance sensor when the attitude of the projector tends to cause part or the entire of the window to be blocked with an obstacle, whereas the control section sets the length of the operation period of the illuminance sensor to be longer than the length of the operation period of the obstacle sensor when the attitude of the projector does not tend to cause part or the entire of the window to be blocked with an obstacle.

7. The projector according to claim 1, wherein
   the control section controls the illuminance sensor and the obstacle sensor such that the projector alternates a plurality of times between the detection of the illuminance by the illuminance sensor and the emission of the second light by the light emitting section of the obstacle sensor, and
   the control section disables the detection of the illuminance by the illuminance sensor during each period for which the light emitting section emits the second light.

8. The projector according to claim 1, wherein the control section controls the illuminance sensor and the obstacle sensor such that the illuminance sensor detects the illuminance for a first operation period and the light emitting section emits the second light for a second operation period that is different from the first operation period.

9. The projector according to claim 8, wherein the second operation period is longer than the first operation period.

10. The projector according to claim 8, wherein the second operation period is shorter than the first operation period.

* * * * *